Aug. 24, 1943.  A. W. MORTON  2,327,934
PISTON RING EXPANDER
Filed Oct. 28, 1939   2 Sheets-Sheet 1
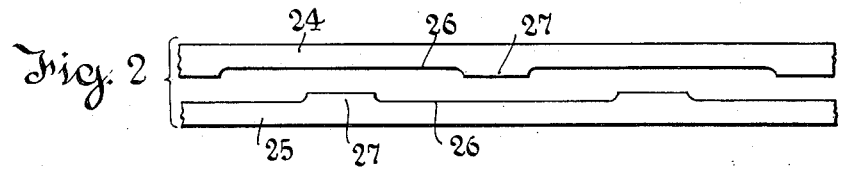
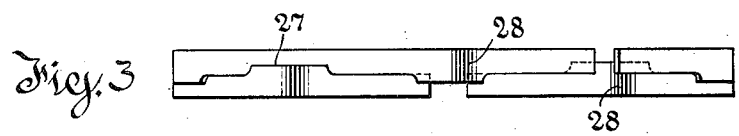
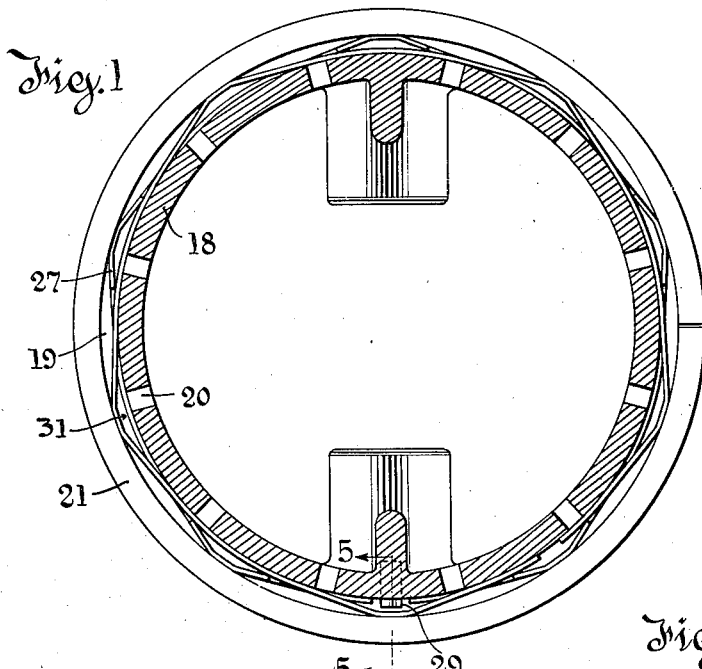
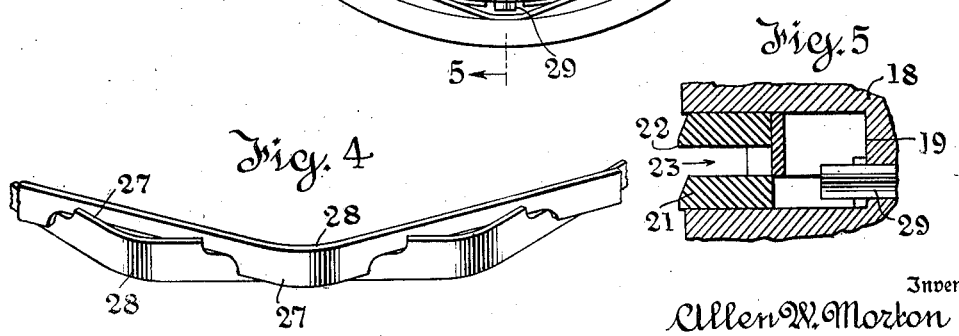
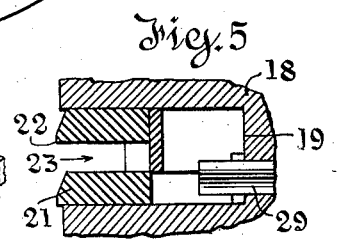
Inventor
Allen W. Morton
By Dodge and Ives
Attorneys Aug. 24, 1943.                A. W. MORTON                2,327,934
                          PISTON RING EXPANDER
                      Filed Oct. 28, 1939        2 Sheets-Sheet 2
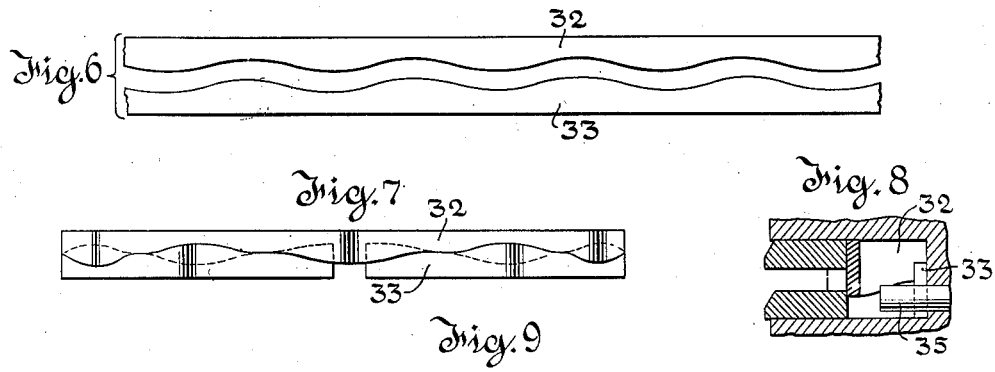
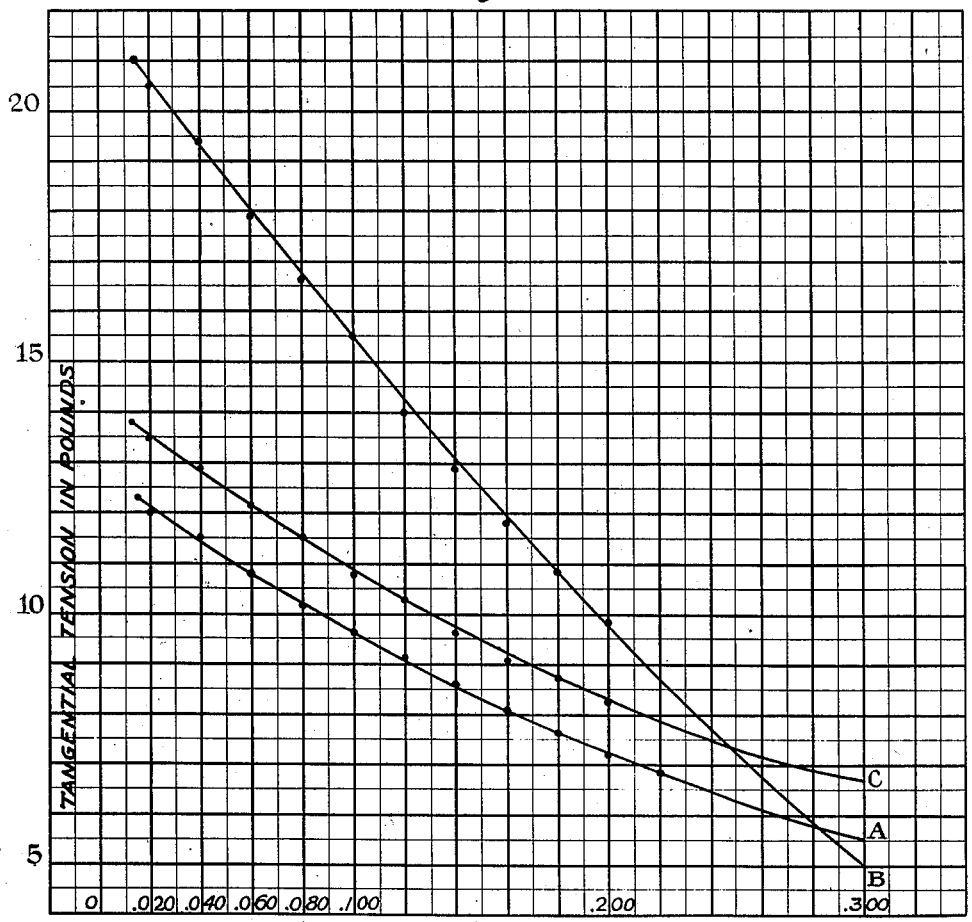

Patented Aug. 24, 1943

2,327,934

UNITED STATES PATENT OFFICE 2,327,934

PISTON RING EXPANDER

Allen W. Morton, Baltimore, Md., assignor to Koppers Company, Pittsburgh, Pa., a corporation of Delaware Application October 28, 1939, Serial No. 301,839

3 Claims. (Cl. 309—43)

This invention relates to piston ring expanders, and more particularly to piston ring expanders for use in conjunction with oil rings. While available for use with cylinders of all sizes, the invention is particularly desirable with large diameter pistons, such as are extensively used in Diesel engines.

To avoid repetition, it may be stated at the outset that the problem presented by an oil ring involves certain considerations peculiar to the oil ring problem, and in the interests of a full statement, the discussion will be on the basis of an oil ring with the understanding, however, that except as to those conditions which are peculiar to oil rings, the statement made will apply to any piston ring. By using the more inclusive discussion on the basis of oil rings, there is no implication of the exclusion of any other type of ring with which the invention would develop some or all of its advantages.

In an engine cylinder, particularly a large engine cylinder, the precise contour and dimension of the cylinder are subject to minor variation in response to temperature and load. This may involve simple changes of dimension while the cylinder remains round, or it may involve changes in form resulting in an out of round condition. Any ring which is mounted in a conventional piston groove and reinforced by an expander is necessarily a relatively light and flexible ring, and the problem is to cause that relatively flexible ring to bear throughout its circumference upon the cylinder walls, and to do so despite such irregularities of form or dimension as may be caused by changes in temperature or changes in load, or both, or by any other conditions which may be encountered in service.

Assume now an expander ring made of strip material and having, for purposes of discussion, a generally pentagonal form so that it has five points of contact with the ring and five intervening points of contact with the bottom of the ring groove. Because of the long span between the points of contact, the "scale" of the expander, i. e., the change in expansive stress developed upon expansion of the ring, is relatively small, but the expansive forces are applied to the ring at widely spaced points, with the result that the bearing of the ring is imperfect, particularly in the larger sizes.

Assume then that to correct this latter defect the number of crimps in the expander is doubled, so that it has ten points of contact with the ring and ten intervening points of contact with the bottom of the ring groove. So far as the uniform expansion of the ring is concerned, the result would be definitely improved, but the "scale" of the spring expander has been greatly changed so that as the ring expands, the expansive effort of the expander diminishes with undue rapidity. As a consequence, if the expansive force of the expander is to be adequate after the ring has worn, it must be much too great when the ring is new, so great that it would cause drag and undue wear when first applied. It follows that the two limiting conditions imposed on a single expander conflict with each other. Even with small diameter rings there is no satisfactory compromise, and with large diameter rings a satisfactory compromise cannot even be approached.

The principle underlying the present invention is the use of two or more expanders, each say of pentagonal form, so that each has five points of contact with the ring and five intervening points of contact with the bottom of the ring groove. These two rings are maintained in proper staggered relation. Thus, the two series of contact points will alternate and the expansive stresses will be delivered to the ring at ten equally spaced points. Nevertheless, the "scale" of the two springs will be low, so that the variations in expansive force as the ring expands and contracts will be no greater than that secured with a single pentagonal expander. This staggered relationship must be maintained without impairment of the flexing characteristics of the two rings, and an important feature of the present invention is the use of two interlocking expanders, the interlocking action being of such character that the rings themselves maintain the proper stagger without entailing undue wear and without materially limiting the individual flexibility of the two expander rings. The preferred method of securing this result is to notch the two rings in such a way that they interlock and maintain the desired staggered relationship.

An important feature of the invention is the formation of the ring in such a way that the crimps or bends which are formed in the expander ring occur at the widest portion of such ring, so that the long intervening spans between the points of contact of the expander with the piston ring are the slender portions of the ring. At this point it may be helpful to state that the expander ring has a generally polygonal form in which the crimps or bends are not sharp angles, but for purposes of description will be hereafter mentioned as the angles between the sides of a polygonal expander ring. Strictly, they are not angles but are short-radius curves or crimps. These offer large areas of contact of the expander with the piston ring and since these occur at the crimps or angles, where the width of the expander ring is maximum, the unit pressure between the expander and the piston ring is comparatively low, with the result that wear on the expander at this point is reduced.

An examination of Fig. 1 will indicate that there are comparatively long arcs of contact between the expander and the bottom of the ring groove. Hence, the unit pressure here is low, also, and the effect is approximately to equalize the unit pressures, i. e., the unit pressure between the expander and the piston ring, and the unit pressure between the expander and the bottom of the ring groove.

At any rate, the contact between the expander and the piston ring occurs over a substantially wide width, providing good bearing and low unit pressure. With such construction, there are no sudden changes of section within zones of flexure. This is desirable because it reduces the tendency toward strain intensification, such as might produce failure under repeated flexures.

Another feature of the invention contemplates means which by engagement with one of a plurality of interlocking rings may prevent the entire assembly of interlocking rings from rotating in the ring groove.

Generally stated, the effect of the invention is to increase the number of points of application of the expansive forces to the ring, while holding the "scale" of the expander low. The importance of this arises not only from such expansion of the ring as occurs in the ordinary reciprocation of the piston, but also on the expansion of the interior of the ring which occurs as the result of wear at the outer surface of the ring.

In some processes of manufacture, the cylinders are finished with the jacket filled with hot liquid, the purpose being to finish to final form under conditions simulating running conditions. Cylinders of this type when cold have a taper, and, consequently, the rings actually expand and contract in the ordinary reciprocation of the piston at least until the engine warms up. Also, where flexible rings with expanders are applied to worn cylinders, the cylinder may have substantial taper, so that in this case, also, the ring expands and contracts during the ordinary reciprocation of the piston. Finally, the wear of the ring itself produces an expansion of the ring as a whole, which affects the stress in the expander and which may seriously limit the useful life of the ring if the expander has a high "scale."

In any case, if the expanders have a high "scale," a new and unworn ring will have an undue expansive tendency and will be subject to undue wear when first installed. The wear which occurs will cause a diminution of the expansive stress with undue rapidity, simply because of the high "scale" of the expander spring.

Furthermore, two overlapping rings which are wider than half the ring groove and are thus reinforced at their points of contact with the ring develop a somewhat greater expansive force than could be had with a single ring of the same over all width. Over all width is necessarily limited to the width of the ring and its groove.

Another point of paramount importance in connection with oil rings is that these rings are ported and flow past the expander rings must be afforded. A single ring extending the full width of the groove must be notched or ported. These notches or ports must be small to avoid undue weakening of the ring. The formation of small highly localized notches or holes is objectionable, because of strain intensification, particularly if any small cracks develop as a result of the methods used to form such notches or ports. On the other hand, two staggered rings notched and overlapped as proposed in the present invention provide the necessary oil passages. The comparatively large notches used to afford the interlocking effect, themselves serve as oil ports and can readily be so formed as to avoid any risk of strain intensification. Consequently, the multiple expander ring interlocking arrangement is not penalized in any degree by the necessity of providing oil passages, since the interlock itself produces these passages.

The invention will now be described in connection with the accompanying drawings, in which:

Figure 1 is a transverse sectional view of a piston, a piston ring, and an expander of the present invention seated within the ring groove to the rear of the ring;

Fig. 2 is a view in elevation of the two resilient strips each of a width less than the width of the ring groove and used to produce the expander structure shown in Fig. 1;

Fig. 3 is a face view showing the strips crimped and interlocked as they are when mounted in the ring groove;

Fig. 4 is a perspective view of a portion of two of the blanks in their assembled position;

Fig. 5 is a cross sectional view taken on the line 5—5 of Fig. 1;

Fig. 6 is a plan view of two strips used in making up a modified type of expander in which the two expander rings not only interlock, but also have a self-aligning tendency;

Fig. 7 is an edge view of the expander ring assembly formed from said strips after the same have been crimped;

Fig. 8 is a transverse section of a portion of a piston and groove with the assembly of Fig. 7 seated therein;

Fig. 9 is a stress-strain diagram contrasting the characteristics of an expander unit of this invention with prior art devices.

In the drawings, 18 denotes a piston having the usual ring groove 19 and drainage openings 20 extending from the bottom of the groove through the piston to drain away excess oil. The piston ring may be of any approved type and is denoted by 21. As shown it is of the well known oil scraping formation wherein a shoulder 22 delivers excess oil to openings 23 which extend through the body of the ring and open into the piston ring groove 19.

The expander ring shown in Figs. 1 to 5, inclusive, comprises two ribbon-like spring steel elements 24, 25. The blanks for the production of such elements are shown in Fig. 2, and may be said to comprise two similar strips notched as at 26 along their adjacent edges, producing projections 27 along one edge of each blank. Each of the strips is crimped as at 28 (Figs. 3 and 4), preferably midway of the extensions or projections 27. When assembled the projections 27 of one element extend over and embrace the oppositely disposed narrow portions of the adjacent expander. Such an arrangement produces interengagement of each of the elements 24 or 25 with reference to the other element 25 or 24, as will be best seen upon reference to Figs. 1 and 4. With such a construction, the crimps need not be closely spaced and the narrowed portions of the element 24, or 25, as the case may be, are relatively straight between the crimps and thus have long bearing and easy flexure against the base of the piston ring groove, as will be clearly seen upon reference to Fig. 1. This interengagement of the elements prevents shifting of one relatively to the other. To preclude shifting of the expander assembly as a whole, a pin 29 (Figs. 1 and 5) may be positioned in the base of the groove so as to project outward between the proximate ends of one member 25. This pin, which is pressed into place, does not preclude the proper functioning of the expander elements, but maintains the expander assembly against rotation about the piston.

There are no holes or openings formed in either of the expander elements, but on the contrary, they present an unbroken surface throughout. Oil drainage is taken care of by the spaces 31 formed between the aligned crimped portions and adjacent flat portions of the expander elements 24 and 25. Inasmuch as the notching of the expander elements is of such depth as not to allow them to completely overlap each other, oil finds its way between the upper and lower edges of the openings or spaces 31 back to the base of the groove and through the openings 20 in the piston. From the foregoing, it will be seen that a multiplicity of bearing points, as for instance, the crimps 28, will be provided and undue wear is thus avoided, particularly where the expanders are used with large size rings and pistons. It is to be noted that in the present structure, the crimps of the two strips, when assembled, are staggered with relation to one another and are so maintained.

The invention is susceptible of modification. In Figs. 6, 7 and 8 an expander ring assembly is shown in which sudden changes of cross-sectional area are avoided and the rings have a self-aligning tendency. The proximate edges of the two strips 32 and 33 are given a similar sinusoidal contour. When assembled as indicated in Fig. 7, the two strips have a combined width which is slightly less than the width of the ring groove. A pin or stake 35 (Fig. 8) is mounted in the bottom of the ring groove and projects outward between the ends of the ring element 33. It prevents the rotation of this ring element and the interengagement of the two rings prevents relative movement of the two ring elements and, in fact, the engagement of the sinusoidal edges produces a centering or aligning tendency, as will be obvious. The arrangement is very similar to that shown in Fig. 2 except for the very gradual changes of section afforded by the sinusoidal edge contour. This form of ring is perhaps more expensive to produce, but is believed to have outstanding advantages.

While the examples above discussed show only two expander ring elements, various elaborations of the idea using more than two expander rings are possible. However, these involve duplication of what is shown and since the use of two rings involves the use of a plurality, and since the two rings are believed to give a better distribution of the expansive force than can be had with a larger number, the forms illustrated are relied upon to disclose the general principle of the invention, which is basically the increase in the number of points of application of expansive force, without increase in the "scale" of the expander spring.

Further, while the invention has been disclosed with reference to rings which are expanded, it will be readily appreciated that where a ring such as that shown in the patent to Morton No. 1,871,820 dated August 16, 1932, is arranged to be contracted about an element which it encircles, the same principles apply.

In other words, while the ordinary spring element is an expander, the same inventive principle can be used with a backing spring for contracting a ring about an encircled element. This is a simple reversal and requires no particular illustration. In certain of the claims reference is made to "an expander ring" or "a ring expander". There appears to be no generic term descriptive of a unit which strictly expands a ring, that is, forces it outward, and a unit which contracts a ring, i. e., forces it inward, and consequently since the two are interchangeable and for the purposes of this invention involve the same principles, the term "expander ring" or "ring expander" is intended to be generic and to represent an element which forces a ring mounted in a groove outward from that groove into contact with some other element, and it is immaterial whether the ring encircle some element or is encircled by that element. Of course, in the reversed arrangement, the crimps or angles of the expander would bear in the base of the groove and the intervening portions of the expander would bear against the ring; but the stress-strain characteristics and the points of application of stress to the ring would involve the same inventive principle as is described in detail with reference to say Figs. 1 to 5.

Fig. 9 is a stress-strain diagram based on actual tests. To indicate the expansion of the piston ring, the width of the gap in the ring was measured. This represents an increment in the circumference and, of course, is directly proportional to the increment in the diameter as the ring expands. It is simpler to measure the gap than it is to measure the diameter because under the conditions of tests it is hard to be certain that a true circular contour is preserved at all times.

It will be assumed that a new piston ring is assembled with a gap of approximately 0.02″ and that the ring is worn out when the gap has increased to 0.20″. The curve marked A represents the conditions with a pentagonal expander, that is one having five points of contact with the ring. It will be observed that the new ring had an expansive force of a little over 12 lbs. when newly applied, and an expansive force of about 7.2 lbs. when the ring was at the end of its life.

The curve marked B gives similar characteristics for a single expander of ten-sided form. This gives ten points of reaction against the ring, which is a satisfactory number, but the maximum expansion force is 20½ lbs., which is altogether too high and the expansive force at the end of the life of the ring was 9.8 lbs.

The curve marked C represents the conditions characteristic of a ring with an expander constructed in accordance with Figs. 1-5. Here, the initial force is 13.5 lbs. and the expansive force at the end of the lift of the ring is 8.2 lbs. An expander constructed according to the invention has characteristics as to the "scale" which approximate the characteristics of a single pentagonal expander. At the same time, it has the advantage of reacting at ten points instead of five upon the ring with which it is assembled. Obviously, the steepness of the curve B is an index to the undesirable "scale" of the expander. The more nearly horizontal the curve as plotted on Fig. 9 can be made, the more uniform the expansive effect will be. The difference in absolute expansive effect between the curves A and C can, of course, be controlled by the design of the spring elements. In curves A and C the minmum expansive force is approximately 60% of the maximum, whereas in curve B it is less than 48%.

The stress-strain diagram in Fig. 9, therefore, illustrates quite clearly on the basis of actual tests, the advantage inherent in the use of multiple expanders, provided staggered relationship is maintained.

While two embodiments of the invention have been described in considerable detail, these are intended to be illustrative of the principles of the invention. The invention, however, is not limited to the specific embodiments but may be variously applied, by the exercise of ordinary mechanical skill.

What is claimed is:

1. A ring expander for insertion in a ring groove behind a sealing ring, and comprising at least two approximately polygonal springs of strip material assembled side by side, and each having a gap to permit expansion and contraction, the proximate edges of said springs being curved to produce narrowed portions which subtend the major portions of the sides of the polygons, so that when the polygonal springs are thus assembled, with their angles staggered, they interengage to prevent relative rotation, and their combined width when assembled is only slightly less than the groove width.

2. A ring expander for insertion in a ring groove behind a sealing ring, comprising two ribbon-like spring elements, each of said elements having a series of outwardly convex crimps formed therein, each element being cut away along one edge thereof between successive crimps, the portions so cut away having rounded end configurations, and subtending the major portion of the interval between successive crimps, said elements being assembled with the cut away edges in contact and the crimped portions of one staggered with reference to those of the other, whereby relative shifting is inhibited and the crimped portions act each as a bow spring.

3. A ring expander for insertion in a ring groove behind a sealing ring, comprising two ribbon-like spring elements, each of said elements being substantially narrower than the width of the ring groove but wider than half such width and having a series of outwardly convex crimps formed therein, each element being cut away along one edge thereof between successive crimps, the portions so cut away having rounded end configurations and subtending the major portion of the interval between successive crimps, said elements being assembled with the cut away edges in contact and the crimps of one staggered with reference to those of the other, whereby relative shifting is inhibited and the crimped portions act each as a bow spring.

ALLEN W. MORTON.